United States Patent [19]

Sako et al.

[11] Patent Number: 4,954,372
[45] Date of Patent: Sep. 4, 1990

[54] METAL SURFACE HYDROPHILICIZING PROCESS AND COMPOSITION

[75] Inventors: Ryohsuke Sako; Akihiko Hasebe; Akira Nishihara; Hiroshi Okita, all of Kanagawa, Japan

[73] Assignee: Nihon Parkerizing Co., Ltd., Tokyo, Japan

[21] Appl. No.: 340,945

[22] Filed: Apr. 20, 1989

[30] Foreign Application Priority Data

Apr. 20, 1988 [JP] Japan .................................. 63-98022

[51] Int. Cl.$^5$ ............................................. B05D 3/02
[52] U.S. Cl. ............................. 427/388.2; 427/388.4; 524/515; 524/521; 525/209; 525/212; 525/218
[58] Field of Search ............... 427/388.5, 388.1, 388.2, 427/388.3, 388.4, 388.5; 524/515, 521; 525/209, 212, 218

[56] References Cited

U.S. PATENT DOCUMENTS 4,610,898 9/1986 Engel et al. .................. 427/388.3 X
4,631,226 12/1986 Jellinek ........................ 427/389.9 X Primary Examiner—Michael Lusignan
Attorney, Agent, or Firm—Ernest G. Szoke; Wayne C. Jaeschke; Norvell E. Wisdom, Jr.

[57] ABSTRACT

A durable hydrophilic surface can be formed on metals by coating them with a composition containing a first water soluble polymer based on polyacrylamide, a second water soluble polymer with at least 60 mole percent of ionizable groups such as acids and quaternary ammonium salts, and a cross linking agent. Water soluble chromium and zirconium salts that can form complexes with the first water soluble polymer are preferred crosslinking agents. The invention is particularly useful for aluminum to be used in heat exchangers.

18 Claims, No Drawings

METAL SURFACE HYDROPHILICIZING PROCESS AND COMPOSITION

FIELD OF THE INVENTION

The present invention relates to a treatment method for imparting corrosion resistance and hydrophilicity to metal surfaces, and particularly to the surfaces of aluminum and aluminum alloys (both described simply as aluminum in the following specification). More particularly, the present invention relates to a treatment method for imparting corrosion resistance and hydrophilicity to the aluminum used in aluminum heat exchangers.

STATEMENT OF RELATED ART

Because the radiating or cooling zones of most heat exchangers are designed to have a contact surface area as large as possible in order to increase the radiating or cooling effect, the gaps or intervals between the fins become very narrow. Atmospheric moisture can condense on the exchange surfaces and particularly in the fin gaps during cooling service, and this condensed water readily forms water droplets when the fin surface is sufficiently hydrophobic. Such water droplet accumulation obstructs or clogs the fin gaps as a consequence of the very narrow fin gap and thus increases the flow resistance and reduces the exchange efficiency of the heat exchanger.

Furthermore, any water droplets collected in the fin gaps are easily dispersed and scattered out by the heat exchanger's blower, and thus cannot be completely caught by the water droplet receiver normally installed at the bottom of the exchanger. As a result, the vicinity of the exchanger can become contaminated with water.

Accordingly, in order to prevent water droplet obstruction or clogging by water droplets remaining in the fin gaps, treatments have been proposed for making aluminum surfaces hydrophilic and thus improving their water wettability.

Various treatment methods for improving the water wettability have been proposed which involve the use, singly or in combination, of hydrophilic inorganic compounds such as water glass, silica sol, or the like, and of organic compounds such as surfactants, water-soluble resins, or the like. Among these methods, the following use polyacrylamide.

Japanese Patent Application Laid Open [Kokai or Unexamined]Number 59-185,779 [185,779/84] relates to "Hydrophilicizing treatment agent for metal surfaces comprising modified polyvinyl alcohol having the silyl group in the molecule, optionally containing inorganic material." Polyacrylamide is listed as one example of water-soluble polymers which may optionally be added to this hydrophilicizing treatment agent.

Japanese Patent Application Laid Open Number 60-101,156 [101,156/85] relates to an "Agent for the formation of a hydrophilic coating on aluminum, which characteristically contains alkali silicate, a low molecular-weight carbonyl-containing organic compound, and water-soluble organic polymer." Here, polyacrylamide is listed as an example of the water-soluble organic polymer.

Japanese Patent Application Laid Open Number 60-221,582 [221,582/85] is directed to an "Aluminum fin for heat exchangers having the characteristic that a hydrophilic inorganic film layer is formed on the surface of aluminum or aluminum alloy and a film layer of a hydrophilic organic polymer with a degree of polymerization $\geq 50$ is established over the preceding." In this case, polyacrylamide is provided as an example of the hydrophilic organic polymer film layer. Furthermore, a compound of a metal such as zirconium, titanium, or the like can also be added as a crosslinker in order to stabilize the film layers.

Japanese Patent Application Laid Open Number 61-8598 [8,598/86]proposes a "Heat-exchanger fin material with excellent surface hydrophilicity having the characteristic that a mixed coating layer of at least one type of water-soluble organic polymer (selected from styrene/maleic acid copolymers, polyacrylamide, butylene/maleic acid copolymers, polyacrylic acid, and their salts) and a silicate compound expressed by $$xM_2O, ySiO_2$$

(M=Li, Na, K, and $y/x \geq 2$) is established on the surface of aluminum or aluminum alloy."

Japanese Patent Application Laid Open Number 62-186,199 [186,199/87] relates to "Aluminum fin material characterized by the formation on the surface of an aluminum fin of a hydrophilic poly(meth)acrylamide-based or crosslinked poly(meth)acrylamide-based organic coating."

However, in the case of co-use of a high-hardness inorganic compound (e.g., colloidal silica or alkali silicate) as in Japanese Patent Application Laid Open Numbers 59-185,779, 60-101,156, and 61-8598 noted above, any die, jig, or the like in any post-processing contact, such as in drawing or squeezing, punching, or the like, of aluminum treated using such a hydrophilicizing treatment agent is subjected to severe abrasion. Furthermore, linear marks are generated on the surface of the worked aluminum.

Japanese Patent Application Laid Open Number 60-221,582 has as its object a solution to a problem occurring with inorganic hydrophilic films. Thus, aluminum carrying an inorganic hydrophilic film can be prepared by using a silicate treatment, boehmite treatment, or the like on aluminum. When such a material is post-processed, it is directly coated with press oil for lubrication, and the press oil is removed with solvent after assembly of the heat exchanger. However, it is difficult to remove the press oil completely; incomplete removal generates water "crawling" or beading, and a hydrophilic surface cannot be obtained. When a hydrophilic organic polymer film layer of polyacrylamide, e.g., is formed over the aforesaid inorganic hydrophilic film treatment, the press oil does not contaminate the inorganic hydrophilic film, and pinholes in the inorganic hydrophilic layer are filled, improving the corrosion resistance. This hydrophilic organic layer is removed in the process in which the press oil is washed off, thus affording a heat exchanger having an inorganic hydrophilic layer. As a consequence, this method does not employ polyacrylamide as a hydrophilic layer, but rather uses it as a temporary protective layer for the inorganic hydrophilic layer, and it is ultimately largely removed from the aluminum surface.

In the method of claim 1 of Japanese Patent Application Laid Open Number 62-221,582, claiming formation of an organic coating using uncrosslinked poly(meth)acrylamide polymer), durable or long-lasting water wettability is not obtained when this polymer is a water-soluble, highly hydrophilic polymer, such as a polyacrylamide or polymethacrylamide homopolymer, because of its facile dissolution by water condensing on the fins in heat exchanger service. One tactic for preventing this disappearance due to dissolution consists of achieving water insolubility for the coated film by the copolymerization of hydrophobic monomer, for example, diethylhexyl acrylate (although neither the ethyl group substitution positions nor the copolymerization ratio are clearly specified), as shown by the example of test specimen No. 4 in Table 1 of this Laid-open application. When used as the water-based dispersion, such a copolymer does in fact prevent disappearance of the film by solution, but the crucial property of hydrophilicity of the film is too low. Corrosion resistance is obtained, but so is water repellency.

Claim 2 of Application Laid Open Number 62-221,582 proposes a method which uses a (meth)acrylamide polymer obtained by the copolymerization of a monomer carrying a crosslinking functional group, such as the methylol group, glycidyl group, aminoethyl group, alkoxymethyl group, or the like. Although one cannot draw clear conclusions due to the absence of concrete examples of crosslinking agents which were actually used or could be used, the presence of crosslinking functional groups in the polymer itself could easily lead to gelation by crosslinking during polymerization or during storage.

In order to prevent white rust, the fins and other exposed parts of aluminum heat exchangers have sometimes been subjected to surface treatments in the form of anodic oxidation films, boehmite films, and resin coating treatments. However, the film surfaces generated by these treatments are almost entirely lacking in water wettability, and in fact are usually water repellent. Chromate conversion coating is also carried out for the purpose of preventing white rust. While chromate conversion coatings do manifest a slight water wettability in the initial stage after film formation, a satisfactory hydrophilicity cannot be obtained merely by chromate treatment alone. Furthermore, chromate conversion coatings tend to convert from hydrophilic surfaces to hydrophobic surfaces with the passage of time, particularly under hot, dry conditions, such as are often encountered by heat-exchanger fin coatings.

The present applicants have conducted various investigations on hydrophilicization treatment methods for aluminum and have filed the following two prior patent applications for hydrophilicizing treatment methods based on acrylamide-type polymers: Japanese Patent Application Number 61-315,816 (29 December 1986) and Japanese Patent Application Number 61-315,818 (29 December 1986). The essence of the teaching in these two applications is the preparation of an aqueous solution mixture of a water-soluble acrylamide-type polymer with a specific composition and a water-soluble crosslinker which can crosslink and thus water-insolubilize this polymer; coating this solution on an aluminum surface, followed by drying and crosslinking in order to form a hydrophilic coating; and using this as such or after the additional formation over it of an inorganic hydrophilic film of, for example, water glass.

However, as discussed above, hydrophilic inorganic coatings, while having a high hydrophilicity, nevertheless present problems in post-processing. Furthermore, when water glass is used, not only does the press oil applied in post-processing itself suffer from a poor "wettability," but the press oil can be saponified by the alkali content in the water glass. It is therefore an object of this invention to increase even further the hydrophilicity, and particularly the durability of the hydrophilicity, achievable with anticorrosion treatment agents based predominantly on organic resin and free from highly abrasive inorganic constituents on the treated surface.

DESCRIPTION OF THE INVENTION

In this description, except in the operating examples or where the contrary is explicitly indicated, all numbers describing amounts of materials or reaction or usage conditions are to be understood as modified by the word "about".

It has been discovered that a high-performance hydrophilic surface on aluminum, which avoids the various problems as described above, can be produced by coating and drying on the aluminum surface an aqueous solution or dispersion comprising, or preferably consisting essentially of, the following components:

(a) a first water-soluble polymer having a chemical structure formally obtainable by polymerizing a mixture of molecules all containing addition-polymerizable carbon-carbon double bonds, wherein at least 40 number percent of the molecules in the mixture have a structure according to the general formula (I)

wherein $R_1$ represents H or $CH_3$; $R_2$ and $R_3$ each independently represents H, alkyl having 1 to 4 carbon atoms, benzyl, or hydroxyalkyl having 2 or 3 carbon atoms;

(b) a second water-soluble polymer having a chemical structure formally obtainable by polymerizing a mixture of molecules all containing addition-polymerizable carbon-carbon double bonds, wherein at least 60 number percent of the molecules in the mixture also contain a moiety selected from the group consisting of carboxyl groups, carboxylate salts, sulfonic acid group, sulfonate salts, phosphonic acid group, phosphonate salts, amino groups, salts of amino groups, and quaternary ammonium groups; and (c) a water-soluble crosslinking agent which is cosoluble with both (a) and (b).

A moderately high-performance hydrophilic, corrosion-resistant film can be obtained using an aqueous mixture of components (a) and (c) alone. However, the hydrophilicity, and particularly the durability of the hydrophilicity, can be substantially increased by the addition of component (b).

The following are non-limiting examples of suitable first water-soluble polymers for component (a) above:

(i) homopolymers of acrylamide, methacrylamide, N-methylacrylamide, N-dimethylacrylamide, etc.;

(ii) nonionic copolymers including residues of unsaturated monomers such as those itemized under (II) below;

(iii) cationic polymers in the form of copolymers including cationic unsaturated monomers such as itemized under (III) below;

(iv) polymers containing moieties produced by a Hofmann or Mannich reaction with monomers bearing suitable groups for such a reaction, and polymers bearing quaternary ammonium groups;

(v) products obtained by the reaction with alkylenepolyamines of copolymers containing acrylate esters;

(vi) anionic copolymers of mixtures including molecules of the type itemized under (IV) below;

(vii) copolymers of mixtures of molecules including maleic anhydride or itaconic acid;

(viii) anionic polymers formally derivable by partial hydrolysis of polymers in categories (i), (ii), or (vi) above; and (ix) amphoteric copolymers from molecular mixtures including examples of both types (III) and (IV) below.

The above mentioned monomers are as follows:

Nonionic monomers (II)

2-hydroxyethyl acrylate or methacrylate; diacetone acrylamide; methylolacrylamide; acryloylmorpholine; acrylonitrile; acrylate or methacrylate esters; styrene; and vinyl acetate

Cationic monomers (III)

Monomers represented by the following general structure:

where $R_1$ is methyl or hydrogen and M is exemplified by the following items i) through v):

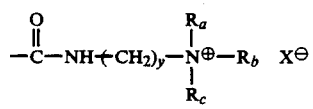 (i)

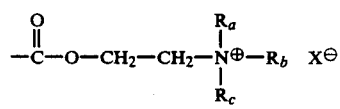 (ii)

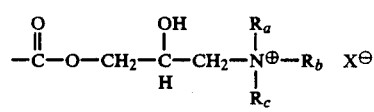 (iii)

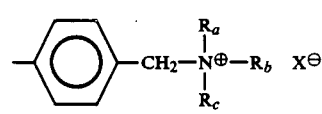 (iv)

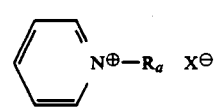 (v)

where $R_a$, $R_b$, and $R_c$ each independently represent H, alkyl, hydroxyalkylphenyl, or benzyl; y=1-3; and X- represents an anion;

Anionic monomers (IV)

Unsaturated monomers containing a phosphonic acid group, a sulfonic acid group, or a carboxylic acid group (such as maleic anhydride, itaconic acid, etc.), or as expressed by the following general structure

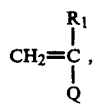

in which Q is exemplified as follows.

—COOH (and salts thereof) (vi)

—SO$_3$H (and salts thereof) (vii)

 (viii)

(and salts thereof)

 (ix)

(and salts thereof)

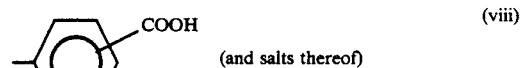 (and salts thereof) (x)

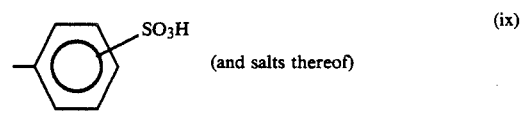 (and salts thereof) (xi)

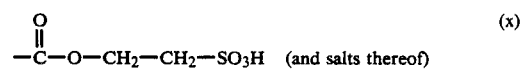 (and salts thereof) (xii)

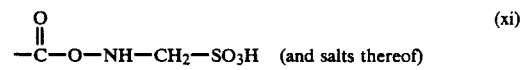 (and salts thereof) (xiii)

The polymers used in this invention do not need to be made by polymerizing the actual monomers from which they can be formally derived. Instead other monomers may be used during polymerization, and the resulting polymer converted by post treatment into the desired chemical form. Polymer post-treatment is exemplified, but not limited, as follows:

1. Conversion into the carboxyl group by hydrolysis of the amide group.
2. Conversion of the amide group into the group

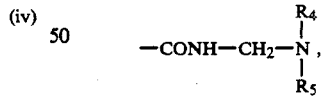

wherein $R_4$ and $R_5$ each are independently alkyl having 1-4 carbon atoms, hydroxyalkyl having 2 or 3 carbon atoms, or a benzyl group, by a Mannich reaction using HNR$_4$R$_5$ and formaldehyde.

3. Introduction of the —CONH—R$_6$—NH$_2$ group, where R$_6$ represents alkylene having 2 through 6 carbon atoms, by reaction of pendant ester groups with the alkylene-diamine H$_2$N—R$_6$—NH$_2$.

4. Preparation of a quaternary ammonium salt by alkylation of an amino group.

The first water soluble polymer (a) preferably has a molecular weight of at least 5,000; when the molecular weight is below 5,000, and particularly for a polymer of high hydrophilicity, it is necessary to increase the proportion of crosslinker in order to achieve water insolubilization. In order to achieve coating uniformity, the molecular weight preferably does not exceed 2,000,000 and more preferably does not exceed 1,000,000.

The water-soluble crosslinking agent (c) may be selected from inorganic crosslinking agents ($X_1$) and organic crosslinking agents ($X_2$). $X_1$ comprises metal compounds which can form complexes with the first water-soluble polymer.

These complex-forming metal compounds (C') comprise metal compounds with a coordination number of at least 4 in the following Table 1. Cr, Ti, Al, and Zr compounds having a high water solubility are particularly effective, for example, chromic acid, dichromic acid and its salts, diisopropoxytitanium bisacetylacetone, the reaction product of lactic acid and titanium alkoxide, zirconium nitrate, zirconyl acetate, ammonium zirconyl carbonate, fluorozirconic acid and its salts, and aluminum sulfate.

TABLE 1

| Coordination Number | Metal Ion | | | | |
|---|---|---|---|---|---|
| 4 | Li(I) | Be(II) | B(III) | Zn(II) | Cd(II) |
|   | Hg(II) | Al(III) | Co(II) | Ni(II) | Cu(II) |
|   | Ag(II) | Au(III) | Pd(II) | Pt(II) | |
| 6 | Ca(II) | Sr(II) | Ba(II) | Ti(IV) | V(III) |
|   | V(IV) | Cr(III) | Mn(II) | Mn(III) | Fe(II) |
|   | Fe(III) | Co(II) | Co(III) | Ni(II) | Pd(IV) |
|   | Pt(IV) | Cd(II) | Al(III) | Sc(III) | Y(III) |
|   | Si(IV) | Sn(II) | Sn(IV) | Pb(II) | Pb(IV) |
|   | Ru(III) | Rh(III) | Os(III) | Ir(III) | lanthanides |
| 8 | Zr(IV) | Hf(IV) | Mo(IV) | W(IV) | |
|   | U(IV) | actinides | | | |

Water-soluble blocked polyisocyanates and/or water-soluble polymethylol, polyglycidyl, and polyaziridyl compounds can be used as the water-soluble organic crosslinking agents ($X_2$). Concrete examples of these organic crosslinking agents are $NaHSO_3$-blocked polyisocyanate (example: Elastron from Daiichi Kogyo Seiyaku Co., Ltd.), methylolmelamine, methylolurea, methylolated polyacrylamide, the diglycidyl ether of polyethylene oxide, and diaziridylated polyethylene oxide.

It is also possible for the water-soluble crosslinking agent (c) to consist of both organic crosslinking agent ($X_2$) and inorganic crosslinking agent ($X_1$) Examples in this regard would be the joint use of water-soluble Cr, Ti, Al, or Zn compounds with water-soluble blocked polyisocyanate, polymethylol, polyglycidyl, or polyaziridyl compounds.

The quantity of use of crosslinking agent (c) will vary with the type of crosslinking agent. Generally speaking, it is used at 1 to 400 weight parts and preferably on the level of 5-200 weight parts per 100 weight parts of first water soluble polymer (a) used.

The second water soluble polymer (b) can include as monomer units any of the cationic or anionic groups given above for comonomers in the first water soluble polymer. Preferred examples are acrylic acid, methacrylic acid, itaconic acid, maleic acid, vinylsulfonic acid, sulfoethyl acrylate, sulfoethyl methacrylate, N-methylenesulfoacrylamide, 2-acrylamido-2-methylpropanesulfonic acid, styrene-sulfonic acid, dimethyldiallylammonium salts, and the quaternary ammonium compounds generated by the reaction of chloromethylstyrene and tertiary amine.

These monomers may also be used as their salts, and may be used in the form of homopolymers or copolymers. In the case of copolymers, the copolymerization of nonionic monomer, for example styrene, (meth)acrylate ester, vinyl acetate, or the like should be limited to no more than 40 mole% and preferably to no more than 20 mole % in order to achieve the object of the present invention.

As with the first water soluble polymer, the second water soluble can be made by polymerizing some suitable monomer(s) other than those desired in the final product, and then reacting the intermediate polymer to produce the desired final product. Thus, acid halide monomer could be used, for example, to make polymers of (meth)acryloyl chloride. This would be subsequently hydrolyzed to give poly(meth)acrylic acid.

The second water soluble polymer should preferably have a molecular weight of at least 1,000 and more preferably a molecular weight of at least 3,000.

While water is the major component of the solvent or dispersion medium of the compositions according to this invention, water soluble solvents such as alcohols, ketones, monoethers of ethylene glycol, and the like can be used jointly in order to adjust the drying rate and/or improve the film properties. The second water soluble polymer in general is added at 1 to 400 parts by weight and preferably is added at 5 to 300 parts by weight per 100 weight parts of the first water soluble polymer.

The stability of the coating solution will vary with its particular composition, and the use of amphoteric polymer in the vicinity of its isoelectric point should preferably be avoided because of the likelihood of precipitation of the polymer. In general, it is preferred that neutrality to acidity be maintained in a coating composition that contains predominantly cationic polymers and that neutrality to alkalinity be maintained in coating compositions that contain predominantly anionic polymers.

Considered from the standpoint of the crosslinking agent, acidic conditions are generally preferred for the use of metal compounds, with the exception of particular compounds such as ammonium zirconyl carbonate and the like containing anions that are unstable in acid. When using organic crosslinking agents, it is preferred from the standpoint of stability that acidity be maintained for isocyanate crosslinking agents while alkalinity should be maintained for methylol, glycidyl, and aziridyl crosslinking agents.

In addition to the ingredients named above, rust inhibitors, fillers, colorants, surfactants, antifoaming agents, leveling agents, and biocides can be added to the coating compositions within a range which does not adversely affect the object of the present invention or the performance of the coating.

Suitable coating methods include immersion or dipping, spraying, brush application, roll application, flow-coating methods, and the like. The concentration and viscosity of the coating composition are adjusted according to the coating methodology used, the desired film thickness, and similar factors connected with the desired results. The film thickness, particularly in heat-exchange service, preferably should be 0.05 microns to 10 microns and more preferably 0.2 microns to 2 microns, in order to increase the thermal efficiency while providing corrosion resistance.

Aluminum can be directly coated after only a degreasing treatment, or the aluminum can be coated after pretreatment, such as with boehmite or a conversion treatment (chromate treatment or the like). The addition of chromic acid or dichromic acid or salts thereof to the coating composition is particularly preferred when the coating composition according to this invention is to be applied without any conversion pretreatment.

Drying of the coating according to this invention is preferably conducted at 90° to 300° C. and more preferably at 100° to 250° C.

The hydrophilic film afforded by means of the present invention has an excellent corrosion resistance and hydrophilicity and in particular a very durable or long-lasting hydrophilicity. It is excellent as a surface coating for aluminum heat exchangers.

The reasons underlying the hydrophilicity and particularly the durability of the hydrophilicity as enhanced by the addition of the cationic or anionic polymer (second water soluble polymer) used in the present invention is not entirely clear. However, it is hypothesized that the increase in hydrophilicity and particularly the increase in the durability of the hydrophilicity may be due to the formation of an interpenetrating network (IPN) structure from the two distinct types of water soluble polymer used. The highly crosslinked structure generated by the reaction of the acrylamide-type polymer (first water soluble polymer) with the crosslinking agent would form one component of the interpenetrating network. The strongly hydrophilic structure, probably relatively little crosslinked, formed from the second water soluble polymer would interpenetrate with the cross-linked component and could be continually transferred to the protective film surface if needed, as a result of postulated dissolution of very small quantities of this very strongly hydrophilic polymer during protracted use.

The practice of the invention can be further appreciated from the following non-limiting operating examples. The test methods used in the examples were as follows:

Contact angle

The contact angle was measured for water droplets 1 to 2 mm in diameter standing on the treated surface, using a FACE contact-angle instrument (model CA-P, from Kyowa Kaimen Kagaku).

Corrosion resistance

The salt-spray test method of JIS Z2371 was used, and the reported value is the spray test time required for the white rust area to reach 5% of the total area.

Water exposure stability

The contact angle was measured in the same manner as noted above after 5 exposure cycles, where 1 cycle consisted of immersion in running water at room temperature for 8 hours, then drying for 16 hours at 80° C.

COMPARISON EXAMPLE 1

An aqueous solution mixture was prepared which contained a 60:40 (molar ratio) copolymer of acrylamide (AM) and sodium 2-acrylamido-2-methylpropanesulfonate (AMPS), with an average molecular weight of approximately 75,000, Parlene® 60-A (chromium-based post-treatment agent from Nihon Parkerizing Company Limited), and chromium fluoride trihydrate, at concentrations of 10 g/L, 3.4 g/L, and 2.5 g/L respectively. This solution was applied on an aluminum surface and then dried in a drier at 180° C. for 3 minutes. The coating add-on mass was 0.25 g/m$^2$.

EXAMPLE 1

Treatment was carried out as in Comparison Example 1, with the modification that the treatment solution also contained 10 g/L of sodium polyacrylate with an average molecular weight of about 140,000.

EXAMPLE 2

Treatment was carried out as in Comparison Example 1, with the modification that the treatment solution additionally contained 10 g/L of solids of an acrylic acid copolymer containing 20 mole % sulfoethyl acrylate, with an average molecular weight of about 80,000 and a pH of 4–6, partially neutralized with Na (AQUALIC® MS-20 from Nippon Shokubai Kagaku Kogyo Co., Ltd., 25% solids aqueous solution).

COMPARISON EXAMPLE 2

Treatment was carried out as in Comparison Example 1, except that the aluminum plate used had been pretreated with a chromic acid solution to give a chromium add-on of about 100 mg/m$^2$, and that 0.5 g/L (as Zr) zirconium ammonium carbonate was used in place of the chromium compounds in the acrylamide copolymer solution.

EXAMPLE 3

This was identical to Comparison Example 2, except that 10 g/L of solids of an aqueous sodium polyacrylate solution with a viscosity of 250 centipoises at 25° C. and a pH of 7.8 (Jurimer® AC-10N from Nihon Junyaku Kabushiki Kaisha, 25% solution) was added to the treatment solution of Comparison Example 2.

EXAMPLE 4

Treatment was conducted as in Example 3, with the modification that AQUALIC® MS-20 was used in place of the Jurimer® AC-10N.

COMPARISON EXAMPLE 3

Treatment was carried out as in Comparison Example 1, with the modification that a 70:30 (molar ratio) copolymer of acrylamide and sodium vinylsulfonate was used as the polymer.

EXAMPLE 5

Treatment was conducted as in Comparison Example 3, with the modification that 10 g/L sodium polyvinylsulfonate with a molecular weight of about 4,000 was added to the treatment solution of Comparison Example 3.

EXAMPLE 6

Treatment was conducted as in Comparison Example 3, with the modification that 10 g/L of the sodium salt of an 20:80 (molar ratio) copolymer of acrylamide and acrylic acid was added to the treatment solution of Comparison Example 3.

COMPARISON EXAMPLE 4

Treatment was conducted as in Comparison Example 1, with the modification that a 50:50 (molar ratio) copolymer of acrylamide and sodium acrylate (AA) was used as the polymer.

EXAMPLE 7

Treatment was conducted as in Comparison Example 4, but after adding, to the treatment solution of Comparison Example 4, 20 g/L of a 20% solids aqueous solution prepared by neutralizing, with sodium hydroxide to pH 7, a 25 % solids aqueous solution of an acrylic acid/methacrylic acid copolymer with an average molecular weight of about 76,000 (VERSICOL ® E-9, from Allied Colloids Limited of Great Britain).

COMPARISON EXAMPLE 5

A mixed solution was prepared which contained 10% polyacrylamide with a molecular weight (MW) of about 700,000 and water soluble urethane resin solution in amounts of 3 g/L and 0.8 g/L, respectively, as solids. (The polyamide was obtained as a reagent in the form of 10 % solids aqueous solution from Tokyo Kasei Kogyo Kabushiki Kaisha and the urethane resin was Elastron TM H-38, 20% aqueous solution, from Dai-ichi Kogyo Seiyaku Co., Ltd.) This mixed solution was applied to a chromic acid treated aluminum plate of the type noted in Comparison Example 2, followed by drying in a drier at 160° C. for 10 minutes.

EXAMPLE 8

Treatment was carried out as in Comparison Example 5, with the modification that the treatment solution additionally contained 9 g/L of sodium polyacrylamido-2-methylpropanesulfonate with an average MW of approximately 140,000.

COMPARISON EXAMPLE 6

A treatment solution was prepared containing 100 g/L of 10% solids aqueous solution of a 60:40 (molar ratio) copolymer of acrylamide and quaternized dimethylaminoethyl methacrylate (DAM) with MW of approximately 950,000, along with 1.6 g/L chromium trifluoride trihydrate. The treatment solution was applied to a chromate-treated aluminum plate, which was then dried for 2 minutes in a 200° C. drier.

EXAMPLE 9

Treatment was conducted as in Comparison Example 6, with the modification that 5 g/L of a 50% solids aqueous solution of polydimethyldiallylammonium salt with a MW of approximately 9,000 (Sharole TM DC-902P from Dai-ichi Kogyo Seiyaku Co., Ltd.) was added to the treatment solution.

COMPARISON EXAMPLES 7a and 7a

Treatment was conducted as in Example 9, with the modification that 10 g/L (for 7a) or 20 g/L (for 7b) of a commercial product containing 27 % by weight of lauryltrimethylammonium chloride as its effective component (Coatmine 24P from Kao Corp.) was substituted for the Sharole DC-902P.

COMPARISON EXAMPLE 8

Treatment was performed as in Example 5, with the modification that sodium polyvinylsulfonate with a MW of approximately 800 was used.

Based on the preceding comparison examples and examples, with results reported in Table 2, the contact angle, a measurement of hydrophilicity, was found to be much better in the examples than in the comparison examples.

TABLE 2

| number | first water-soluble polymer | second water-soluble polymer (or analog) | crosslinker | contact angle initial | contact angle after running water | salt spray test hours |
|---|---|---|---|---|---|---|
| Comparison Example 1 | AM/AMPS = 60/40 | — | A-60 CrF$_3$ | 20~26° | 30~34° | >240 |
| Example 1 | AM/AMPS = 60/40 | AA-Na (MW 140,000) | A-60 CrF$_3$ | <5° | 16~21° | >240 |
| Example 2 | AM/AMPS = 60/40 | AQUALIC MS-20 | A-60 CrF$_3$ | <5° | 20~25° | >240 |
| Comparison Example 2 | AM/AMPS = 60/40 | — | zirconium ammonium carbonate | 20~28° | 32~36° | >240 |
| Example 3 | AM/AMPS = 60/40 | Jurimer AC-10N | zirconium ammonium carbonate | <5° | 15~23° | >240 |
| Example 4 | AM/AMPS = 60/40 | AQUALIC MS-20 | zirconium ammonium carbonate | <5° | 13~22° | >240 |
| Comparison Example 3 | AM/VSA = 70/30 | — | A-60 CrF$_3$ | 18~23° | 56~59° | >240 |
| Example 5 | AM/VSA = 70/30 | VSA | A-60 CrF$_3$ | <5° | 20~30° | 216 |
| Example 6 | AM/VSA = 70/30 | AM/AA-Na = 20/80 | A-60 CrF$_3$ | 5~10° | 22~33° | >240 |
| Comparison Example 4 | AM/AA = 50/50 | — | A-60 CrF$_3$ | <15° | 43~48° | >240 |
| Example 7 | AM/AA = 50/50 | VERSICOL E-9 | A-60 CrF$_3$ | <5° | 25~31° | >240 |
| Comparison Example 5 | AM only | — | Elastron H-38 | 35~40° | 43~50° | >240 |
| Example 8 | AM only | AMPS | Elastron H-38 | <5° | 12~18° | >240 |
| Comparison Example 6 | AM/DAM = 60/40 quaternized | — | CrF$_3$ | 30~35° | 55~60° | 216 |
| Example 9 | AM/DAM = 60/40 quaternized | Sharole DC-902P | CrF$_3$ | 10~13° | 33~38° | 204 |
| Comparison Example 7a | AM/DAM = 60/40 quaternized | Coatamine 24P | CrF$_3$ | <5° | 50~55° | 204 |
| Comparison | AM/DAM = | Coatamine | CrF$_3$ | <5° | 45~53° | 144 |

TABLE 2-continued

| number | first water-soluble polymer | second water-soluble polymer (or analog) | crosslinker | contact angle initial | contact angle after running water | salt spray test hours |
| --- | --- | --- | --- | --- | --- | --- |
| Example 7b | 60/40 Quaternized AM/VSA = 70/30 | 24P | | | | |
| Comparison Example 8 | | low-molecular weight VSA | A-60 CrF$_3$ | <5° | 48~52° | 96 |

What is claimed is:

1. A coatable fluid composition of matter consisting essentially of materials selected from the group consisting of water, water soluble organic solvents, water soluble polymers, polymer crosslinking agents, corrosion inhibitors, fillers, colorants, surfactants, antifoaming agents, leveling agents, and biocides, said coatable fluid composition comprising:

(A) a first water soluble polymer having a molecular weight of at least about 5,000 and having a chemical structure formally obtainable by polymerizing a mixture of molecules all containing addition-polymerizable carbon-carbon double bonds, wherein at least 40 number percent of the molecules in the mixture have a structure according to the general formula (I)

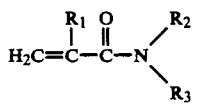
(I)

wherein $R_1$ represents H or $CH_3$; $R_2$ and $R_3$ each independently represents H, alkyl having 1 to 4 carbon atoms, benzyl, or hydroxyalkyl having 2 to 3 carbon atoms;

(B) a second water soluble polymer having a molecular weight of at least about 1,000 and having a chemical structure formally obtainable by polymerizing a mixture of molecules all containing addition-polymerizable carbon-carbon double bonds, wherein at least 60 number percent of the molecules in the mixture also contain a moiety selected from the group consisting of carboxyl groups, carboxylate salts, sulfonic acid group, sulfonate salts, phosphonic acid group, phosphonate salts, amino groups, salts of amino groups, and quaternary ammonium groups; and (C) a water-soluble crosslinking agent which is cosoluble with both (A) and (B), the weight ratio of component (B) to component (A) in said coatable composition being about 0.01 to 4 and the weight ratio of component (C) to component (A) in said coatable composition being about 0.01 to 4.

2. A composition according to claim 1, wherein component (A) has a molecular weight of less than about 2,000,000, the weight ratio of component (B) to component (A) is about 0.05 to 3, the weight ratio of component (C) to component (A) is about 0.05 to 3, and the mixture of molecules from which component (B) is formally derived comprises at least 80 number % of molecules that contain a moiety selected from the group consisting of carboxyl groups, carboxylate salts, sulfonic acid group, sulfonate salts, phosphonic acid group, phosphonate salts, amino groups, salts of amino groups, and quaternary ammonium groups.

3. A composition according to claim 2, wherein the mixture of molecules from which component (B) is formally derived comprises at least 60 number % selected from the group consisting of acrylic acid, methacrylic acid, itaconic acid, maleic acid, vinylsulfonic acid, sulfoethyl acrylate, sulfoethyl methacrylate, N-methylenesulfonic acid acrylamide, 2-acrylamido-2-methylpropanesulfonic acid, styrenesulfonic acid, salts of any of the foregoing, dimethyldiallylammonium salts, and quaternary ammonium compounds obtained by the reaction of chloromethylstyrene with a tertiary amine.

4. A composition according to claim 2, wherein the content of crosslinking agent consists essentially of water soluble compounds containing chromium, water soluble compounds containing zirconium, or water soluble mixtures of compounds of chromium and zirconium.

5. A process for forming a hydrophilic surface on a metal substrate, comprising the steps of:

(A) coating the substrate with a film of a fluid aqueous composition consisting essentially of materials selected from the group consisting of water, water-soluble organic solvents, water soluble polymers, polymer crosslinking agents, corrosion inhibitors, fillers, colorants, surfactants, antifoaming agents, leveling agents, and biocides, said fluid aqueous composition comprising:

(1) a first water soluble polymer having a molecular weight of at least about 5,000 and having a chemical structure formally obtainable by polymerizing a mixture of molecules all containing addition-polymerizable carbon-carbon double bonds, wherein at least 40 number percent of the molecules in the mixture have a structure according to the general formual (I)

(I)

wherein $R_1$ represents H or $CH_3$; $R_2$ and $R_3$ each independently represents H, alkyl having 1 to 4 carbon atoms, benzyl, or hydroxyalkyl having 2 to 3 carbon atoms;

(2) a second water soluble polymer having a molecular weight of at least about 1,000 and having a chemical structure formally obtainable by polymerizing a mixture of molecules all containing addition-polymerizable carbon-carbon double bonds, wherein at least 60 number percent of the molecules in the mixture also contain a moiety selected from the group consisting of carboxyl groups, carboxylate salts, sulfonic acid group, sulfonate salts, phosphonic acid group, phosphonate salts, amino groups, salts of amino groups, and quaternary ammonium groups; and (3) a water-soluble crosslinking agent which is cosoluble with both (2) and (3), the weight ratio of component (2) to component (1) in said fluid aqueous composition being in the range from about 0.01 to 4 and the weight ratio of component (3) to component (1) in said fluid aqueous composition being in the range from about 0.01 to about 4; and (B) heating the coated substrate formed in step (A) for a sufficient time to dry the coating and make it adherent to the substrate.

6. A process according to claim 5, wherein the metal coated is aluminum or an aluminum alloy.

7. A process according to claim 6, wherein the thickness of the coating formed is between about 0.05 microns and about 10 microns.

8. A process according to claim 7, wherein the thickness of the coating formed is between about 0.2 microns and about 2 microns.

9. A process according to claim 6, wherein step (B) is performed at a temperature between about 90° C. and about 300° C.

10. A process according to claim 5, wherein component (1) has a molecular weight of less than about 2,000,000, the weight ratio of component (2) to component (1) is about 0.05 to 3, the weight ratio of component (3) to component (1) is about 0.05 to 3, and the mixture of molecules from which component (2) is formally derived comprises at least 80 number % of molecules that contain a moiety selected from the group consisting of carboxyl groups, carboxylate salts, sulfonic acid group, sulfonate salts, phosphonic acid group, phosphonate salts, amino groups, salts of amino groups, and quaternary ammonium groups.

11. A process according to claim 10, wherein the mixture of molecules from which component (2) is formally derived comprises at least 60 number % selected from the group consisting of acrylic acid, methacrylic acid, itaconic acid, maleic acid, vinylsulfonic acid, sulfoethyl acrylate, sulfoethyl methacrylate, N-methylenesulfonic acid acrylamide, 2-acrylamido-2-methylpropanesulfonic acid, styrenesulfonic acid, salts of any of the foregoing, dimethyldiallylammonium salts, and quaternary ammonium compounds obtained by the reaction of chloromethylstyrene with a tertiary amine.

12. A process according to claim 11, wherein the content of crosslinking agent consists essentially of water soluble compounds containing chromium, water soluble compounds containing zirconium, or water soluble mixtures of compounds of chromium and zirconium.

13. A process according to claim 10, wherein the content of crosslinking agent consists essentially of water soluble compounds containing chromium, water soluble compounds containing zirconium, or water soluble mixtures of compounds of chromium and zirconium.

14. A process according to claim 5, wherein the content of crosslinking agent consists essentially of water soluble compounds containing chromium, water soluble compounds containing zirconium, or water soluble mixtures of compounds of chromium and zirconium.

15. A process according to claim 9, wherein the content of crosslinking agent consists essentially of water soluble compounds containing chromium, water soluble compounds containing zirconium, or water soluble mixtures of compounds of chromium and zirconium.

16. A process according to claim 8, wherein the content of crosslinking agent consists essentially of water soluble compounds containing chromium, water soluble compounds containing zirconium, or water soluble mixtures of compounds of chromium and zirconium.

17. A process according to claim 7, wherein the content of crosslinking agent consists essentially of water soluble compounds containing chromium, water soluble compounds containing zirconium, or water soluble mixtures of compounds of chromium and zirconium.

18. A process according to claim 6, wherein the content of crosslinking agent consists essentially of water soluble compounds containing chromium, water soluble compounds containing zirconium, or water soluble mixtures of compounds of chromium and zirconium.

* * * * *